US011461809B2

(12) United States Patent
Arroyo et al.

(10) Patent No.: US 11,461,809 B2
(45) Date of Patent: Oct. 4, 2022

(54) NOTIFYING A USER OF AN INSTANT MESSAGING (IM) SERVICE ABOUT A MODIFICATION MADE TO AN OPPORTUNITY

(71) Applicant: International Business Machines Corporation, Armonk, NY (US)

(72) Inventors: Jorge A. Arroyo, Carmel, IN (US);
Stephen P. Kruger, Dublin (IE);
Patrick J. O'Sullivan, Dublin (IE);
Luciano Silva, Apex, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1054 days.

(21) Appl. No.: 14/449,738

(22) Filed: Aug. 1, 2014

(65) Prior Publication Data
US 2016/0034967 A1    Feb. 4, 2016

(51) Int. Cl.
| | |
|---|---|
| *G06Q 30/02* | (2012.01) |
| *G06Q 10/10* | (2012.01) |
| *H04L 51/046* | (2022.01) |
| *H04W 4/14* | (2009.01) |
| *H04L 51/226* | (2022.01) |
| *H04L 67/55* | (2022.01) |
| *H04L 51/18* | (2022.01) |
| *H04W 4/12* | (2009.01) |

(52) U.S. Cl.
CPC ....... *G06Q 30/0269* (2013.01); *G06Q 10/107* (2013.01); *H04L 51/046* (2013.01); *H04L 51/18* (2013.01); *H04L 51/226* (2022.05); *H04L 67/55* (2022.05); *H04W 4/14* (2013.01); *H04W 4/12* (2013.01)

(58) Field of Classification Search
CPC ......... G06F 17/30997; G06F 17/30386; G06F 17/3053; G06Q 30/00; G06Q 30/0269
USPC ...................................... 705/14.53
See application file for complete search history.

(56) References Cited

U.S. PATENT DOCUMENTS

| | | |
|---|---|---|
| 7,153,211 B2 | 12/2006 | Campaigne |
| 7,707,249 B2 * | 4/2010 | Spataro ................ H04L 65/403 709/205 |
| 7,877,266 B2 | 1/2011 | Brydon et al. |
| (Continued) | | |

OTHER PUBLICATIONS

"Marketing Using Web 2.0" Salvatore Parise and Patricia J. Guinan; 2008.*

(Continued)

*Primary Examiner* — Victoria E. Frunzi
(74) *Attorney, Agent, or Firm* — Steven L. Nichols; Fabian VanCott (57) ABSTRACT

Notifying a user of an instant message (IM) service about a modification made to an opportunity includes receiving at least one modification to an opportunity stored in a customer relationship management (CRM) system, the opportunity representing a complex record structure in the CRM system, identifying a first user associated with the modification made to the opportunity stored in the CRM system, determining, from a list of users associated with the opportunity, a second user associated with the first user through an IM service, and sending an alert to the second user on the IM service, the alert indicating to the second user the modification made to the opportunity by the first user.

20 Claims, 6 Drawing Sheets

(56) References Cited

U.S. PATENT DOCUMENTS

| | | | |
|---|---|---|---|
| 8,060,820 B2* | 11/2011 | Bedi | G06Q 10/107 |
| | | | 715/256 |
| 8,938,669 B1* | 1/2015 | Cohen | H04L 65/403 |
| | | | 715/255 |
| 2003/0225591 A1* | 12/2003 | Clay | G06Q 10/10 |
| | | | 705/1.1 |
| 2004/0102995 A1 | 5/2004 | Boppana | |
| 2007/0174110 A1 | 7/2007 | Andrews et al. | |
| 2009/0198686 A1 | 8/2009 | Cushman, II et al. | |
| 2010/0185968 A1 | 7/2010 | Hsu et al. | |
| 2011/0113057 A1 | 5/2011 | Lee et al. | |
| 2012/0059767 A1 | 3/2012 | Uthmann | |
| 2012/0102036 A1 | 4/2012 | Parker, III et al. | |
| 2012/0278091 A1 | 11/2012 | Yaseen et al. | |
| 2012/0323639 A1* | 12/2012 | Sabharwal | G06Q 10/067 |
| | | | 705/7.38 |
| 2013/0085838 A1 | 4/2013 | Tennenholtz et al. | |
| 2013/0110932 A1 | 5/2013 | Itani | |
| 2013/0218640 A1 | 8/2013 | Kidder | |
| 2014/0082070 A1 | 3/2014 | Chakraborty | |
| 2014/0164055 A1* | 6/2014 | Knight | G06Q 30/0201 |
| | | | 705/7.29 |
| 2014/0207801 A1* | 7/2014 | Palmert | G06F 17/30867 |
| | | | 707/749 |
| 2014/0282101 A1* | 9/2014 | Beechuk | H04W 4/003 |
| | | | 715/753 |
| 2014/0355750 A1 | 12/2014 | Chan | |
| 2014/0380190 A1* | 12/2014 | Mondri | H04L 65/1069 |
| | | | 715/753 |
| 2015/0026604 A1* | 1/2015 | Mulukuri | G06Q 50/01 |
| | | | 715/758 |

OTHER PUBLICATIONS

List of IBM Patents or Patent Applications Treated as Related; Aug. 1, 2014.
https://web.archive.org/web/20120531014428/http://www.poltys.com/products/da_overview.html; May 2012.
http://www.poltys.com/en/products/CRMIntegration/crm_integration_overview.html; Aug. 2014.
List of IBM Patents or Patent Applications Treated as Related; Jun. 8, 2015.

* cited by examiner

NOTIFYING A USER OF AN INSTANT MESSAGING (IM) SERVICE ABOUT A MODIFICATION MADE TO AN OPPORTUNITY

BACKGROUND

The present invention relates to notifying a user of an instant messaging (IM) service about modifications, and more specifically, notifying a user of an IM service about modifications made to an opportunity.

A customer relationship management (CRM) system uses techniques and methods to gather, organize, automate, and synchronize sales, for marketing, customer service, and technical support. The CRM system stores this information in a database. Further, this information is retrieved from the database and analyzed to allow a company to better target various customers.

BRIEF SUMMARY

A method for notifying a user of an instant message (IM) service about a modification made to an opportunity includes receiving at least one modification to an opportunity stored in a customer relationship management (CRM) system, the opportunity representing a complex record structure in the CRM system, identifying a first user associated with the modification made to the opportunity stored in the CRM system, determining, from a list of users associated with the opportunity, a second user associated with the first user through an IM service, and sending an alert to the second user on the IM service, the alert indicating to the second user the modification made to the opportunity by the first user.

A system for notifying a user of an IM service about a modification made to an opportunity includes a receiving engine to receive at least one modification made to an opportunity stored in a CRM system, the opportunity representing a complex record structure in the CRM system, in which each of the opportunities captures a number of fields of metadata, an identifying engine to identify a first user associated with the modification made to the opportunity stored in the CRM system, a list determining engine to determine a list of users associated with the opportunity, a second user determining engine to determine, from the list of users associated with the opportunity, a second user associated with the first user through an IM service, and a sending engine to send an alert to the second user of the IM service, the alert indicating to the second user the modification made to the opportunity by the first user.

A computer program product includes a computer readable storage medium, the computer readable storage medium having computer readable program code embodied therewith. The computer readable program code having computer readable program code to identify a first user associated with a modification made to an opportunity stored in a CRM system, determine a list of users associated with the opportunity, determine, from the list of users associated with the opportunity, a second user associated with the first user through an IM service, and send an alert to the second user of the IM service, the alert indicating to the second user the modification made to the opportunity by the first user.

BRIEF DESCRIPTION OF THE SEVERAL VIEWS OF THE DRAWINGS

The accompanying drawings illustrate various examples of the principles described herein and are a part of the specification. The examples do not limit the scope of the claims.

Throughout the drawings, identical reference numbers designate similar, but not necessarily identical, elements.

DETAILED DESCRIPTION

The present specification describes a method and system for notifying a user of an instant message (IM) service about a modification made to an opportunity, such that the user receives an alert indicating that a modification to the opportunity has been made.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punch-cards or raised structures in a groove having instructions recorded thereon, or any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus, to produce a machine such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or blocks or block diagram.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the customer relationship management (CRM) system uses techniques and methods to organize, automate, and synchronize sales, for marketing, customer service, and technical support. This information that the CRM system gathers is stored in a database. Further, this information may be categorized as opportunities in the database. A user associated with a company may view the opportunities gathered by the CRM system to determine which opportunities have changed and which opportunities may benefit from further action.

Further, a user may be associated with a number of the opportunities. If one of the opportunities is modified, it may be beneficial for the user to manually take an action regarding the modification to the opportunities. Manually taking an action may include approving a transaction for the opportunities, contacting a customer for the opportunities, reprioritizing activities associated with the opportunities, terminating the opportunities, taking other actions, or combinations thereof. Further, the user that is associated with many opportunities may spend a significant amount of time manually tracking modifications made to the opportunities. Manually tracking these modifications may be prone to oversight. The oversight may result in failing to act on changes that may advance the development of the opportunities.

The principles described herein include a system and a method for notifying a user of an IM service about a modification made to an opportunity. Such a system and method includes receiving at least one modification to an opportunity stored in a CRM system, the opportunity representing a complex record structure in the CRM system, identifying a first user associated with the modification made to the opportunity stored in the CRM system, determining, from a list of users associated with the opportunity, a second user associated with the first user through an IM service, and sending an alert to the second user on the IM service, the alert indicating to the second user the modification made to the opportunity by the first user. Such a system and method allows a user of an IM service to be notified of modifications to a number of opportunities. As a result, the system and method allows a second user to receive an alert in the IM service indicating that a modification to the opportunity has occurred In the specification and appended claims, the term "opportunities" is meant to be understood broadly as a complex record structure in a CRM system, in which each of the opportunities captures a number of fields of metadata. In one example, the opportunities may include a business's sales and/or interaction with current customers, future customers, or combinations thereof.

In the specification and appended claims, the term "metadata" is meant to be understood broadly as information that is associated with an opportunity. In one example, metadata for each of the opportunities includes a design specification, a platform specification, a fixpack specification, a version specification, an operating system (OS) specification, a time line, a risk, a cost, a performance result, an integration middleware specification, members associated with the opportunities, an upgrade, a product, a staging, other metadata, or combinations thereof. In one example, the metadata associated with an opportunity may store a list of users that have registered interest in the opportunity.

In the specification and appended claims, the term "modification" is meant to be broadly as a change in metadata that is associated with an opportunity. In one example, the metadata associated with an opportunity may be modified. In another example of a modification, the metadata associated with an opportunity may change to record a sale associated with the opportunity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described in connection with that example is included as described, but may not be included in other examples.

Figure 1:
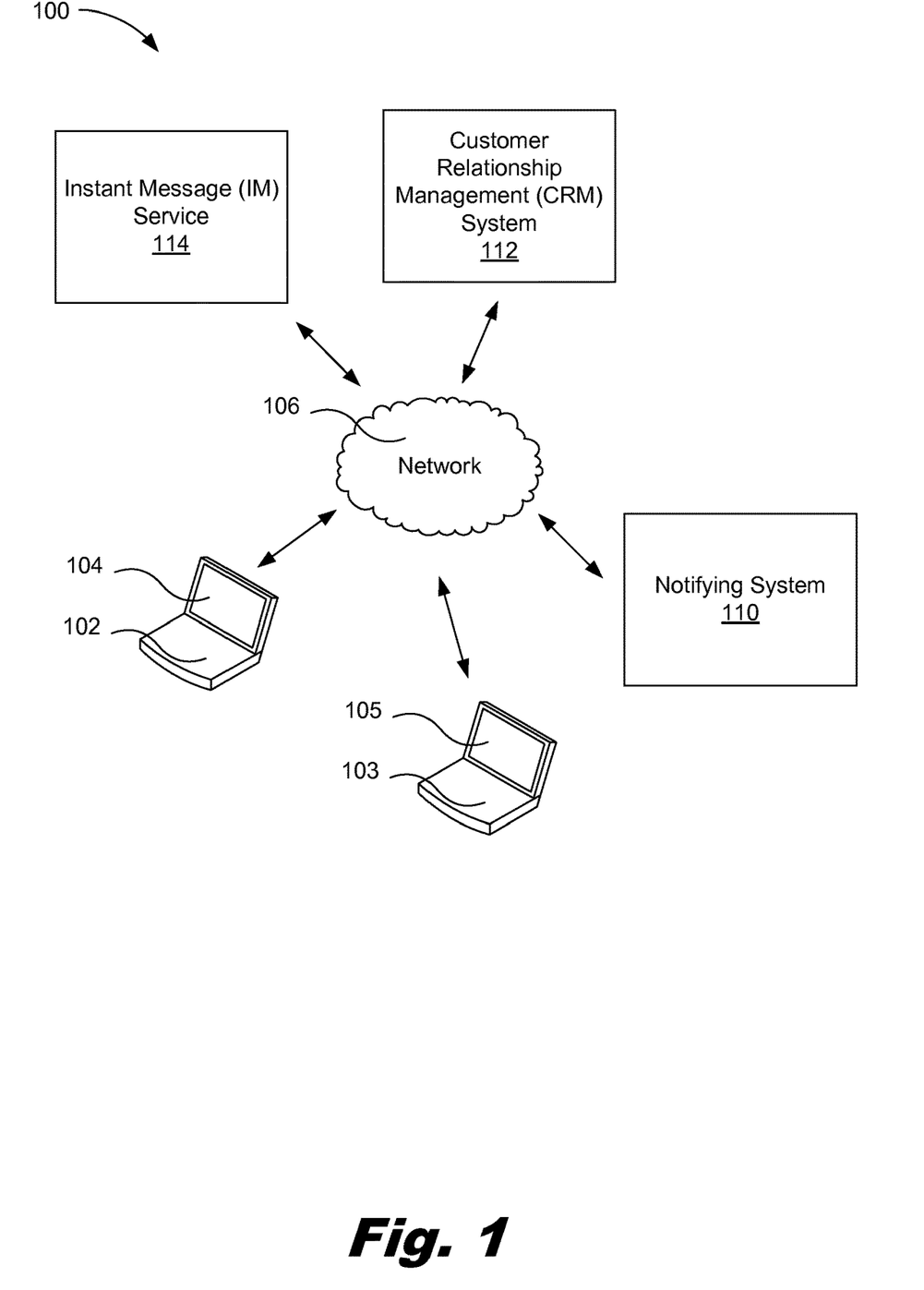
FIG. 1 is a diagram of an example of a system for notifying a user of an instant messaging (IM) service about a modification made to an opportunity, according to one example of principles described herein.

Referring now to the figures, FIG. 1 is a diagram of an example of a system for notifying a user of an IM service about a modification made to an opportunity, according to one example of principles described herein. As will be described below, a notifying system is in communication with a network to receive at least one modification to an opportunity stored in a CRM system, the opportunity representing a complex record structure in the CRM system. The notifying system identifies a first user associated with the modification made to the opportunity stored in the CRM system. Further, the notifying system determines, from a list of users associated with the opportunity, a second user associated with the first user through an IM service. The notifying system sends an alert to the second user on the IM service, the alert indicating to the second user the modification made to the opportunity by the first user.

As illustrated in FIG. 1, the system (100) includes a CRM system (112). In one example, the CRM system (112) is used as a model for managing a business's interactions with current and future customers. The CRM system (112) uses techniques and methods to organize, automate, and synchronize sales for marketing, customer service, and technical support. This information that the CRM system (112) gathers is stored in the CRM system's memory. Further, this information may be categorized as opportunities in the CRM system's memory. A first user may make modifications to the opportunities in the CRM system (112) via a display (104) on a first user device (102). As will be described below, a second user may receive an alert of modifications to the opportunities in the CRM system (112) via a display (105) on a second user device (103).

As illustrated in FIG. 1, the system (100) includes a notifying system (110). The notifying system (110) is in communication with a network (106) to receive at least one modification to an opportunity stored in a CRM system (112). In one example, the opportunity represents a complex record structure in the CRM system (112). Further, the opportunity may be associated with a number of fields of metadata. As will be described in other parts of this specification, hundreds of fields of metadata may be associated with each opportunity.

Further, the notifying system (110) identifies a first user associated with the modification made to the opportunity stored in the CRM system (112). In one example, the modification may be made by the first user via the first user device (102). Further, the first user may be the user who made the modification to the opportunity stored in the CRM system (112).

The notifying system (110) further determines, from a list of users associated with the opportunity, a second user associated with the first user through an IM service (114). In this example, the first user and the second user may be associated with the opportunity. Further, the first user and the second user may be associated with each other via the IM service (114).

Further, the notifying system (110) sends an alert to the second user on the IM service (114), the alert indicating to the second user the modification made to the opportunity by the first user. In one example, the alert may be sent from the notifying system (110) to the second user device (103) such that the second user receives the alert. For example, the alert may be displayed via a user interface (UI) on the display (105) of the second user device (103). The alert may indicate, via an icon or a symbol, that the first user has made a modification to the opportunity. As a result, the system (100) allows the second user to receive an alert via the IM service (114) indicating that a modification to the opportunity may occur, has occurred, or will occur at a future time. More information about the notifying system (110) will be described in later parts of this specification.

While this example has been described with reference to the notifying system being located over the network, the notifying system may be located in any appropriate location. For example, the notifying system may be located in a user device, a database, a CRM system, other locations, or combinations thereof.

Figure 2:
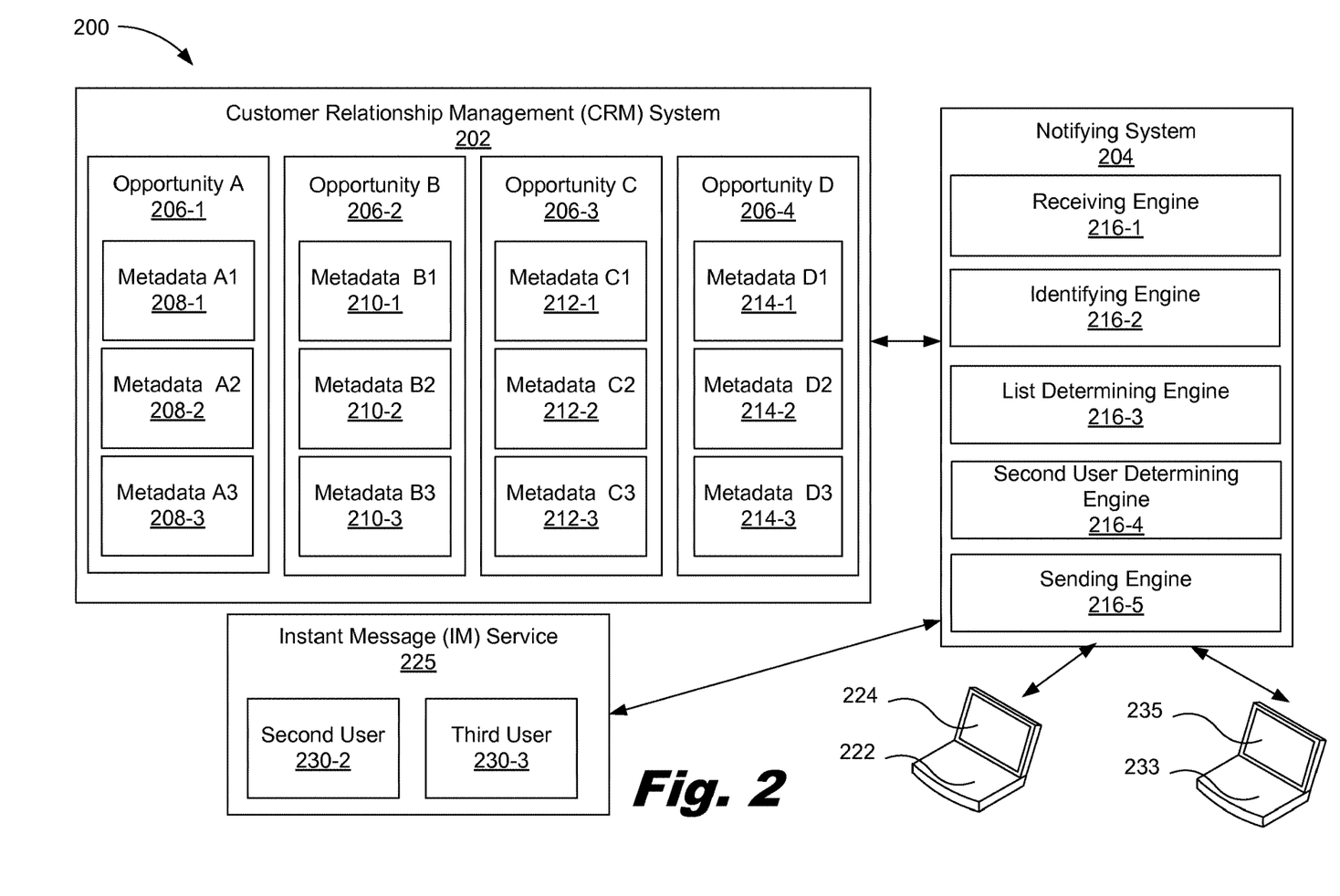
FIG. 2 is a diagram of an example of a system notifying a user of an IM service about a modification made to an opportunity, according to one example of principles described herein.

FIG. 2 is a diagram of an example of a system for notifying a user of an IM service about a modification made to an opportunity, according to one example of principles described herein. As mentioned above, a notifying system is in communication with a network to receive at least one modification to an opportunity stored in a CRM system, the opportunity representing a complex record structure in the CRM system. The notifying system identifies a first user associated with the modification made to the opportunity stored in the CRM system. Further, the notifying system determines, from a list of users associated with the opportunity, a second user associated with the first user through an IM service. The notifying system sends an alert to the second user on the IM service, the alert indicating to the second user the modification made to the opportunity by the first user.

As illustrated in FIG. 2, the system (200) includes a CRM system (202). In one example, the CRM system (202) is used as a model for managing a business's interactions with current and future customers. The CRM system (202) uses techniques and methods to organize, automate, and synchronize sales, for marketing, customer service, and technical support. In one example, the CRM system (202) may be a classical CRM system that monitors sources such as current customers and potentially future customers to gather information to better target various customers. The classical CRM system traditionally includes a one-way communication between a business and the customer.

In another example, the CRM system (202) may be a social CRM system that monitors sources such as social media sources. In this example, the social CRM system's strategy is based around customer engagement and interactions, with transactions being a byproduct. In one example, the Social CRM system may use a philosophy and a business strategy, supported by a technology platform, business rules, workflow, processes and social characteristics, designed to engage the customer in a collaborative conversation in order to provide mutually beneficial value in a trusted and transparent business environment. Further, the social CRM system includes applications in marketing, customer service and sales, including peer-to-peer customer support, idea management, market research, product launch, brand reputation management.

In this example, the social CRM system is a back-end process and system for managing customer relationships and data in an efficient and process-centric way. The social CRM system is able to understand the business's challenges that are to be solved and then solve the business's challenges. Further, the social CRM system may be one component of developing a social or collaborative business, both internally and externally.

As illustrated in FIG. 2, the CRM system (202) includes a number of opportunities (206). As mentioned above, the opportunities represent a complex record structure in the database, in which each of the opportunities captures a number of fields of metadata. In this example, the opportunities (206) may include opportunity A (206-1), opportunity B (206-2), opportunity C (206-3), and opportunity D (206-4).

In one example, the opportunities (206) include metadata that is associated with each of the opportunities (206). For example, opportunity A (206-1) includes metadata A1 (208-1), metadata A2 (208-2), and metadata A3 (208-3). Opportunity B (206-2) includes metadata B1 (210-1), metadata B2 (210-2), and metadata B3 (210-3). Opportunity C (206-3) includes metadata C1 (212-1), metadata C2 (212-2), and metadata C3 (212-3). Opportunity D (206-1) includes metadata D1 (214-1), metadata D2 (214-2), and metadata D3 (214-3).

The metadata (208, 210, 212, 214) for each of the opportunities (206) may include a design specification, a platform specification, a fixpack specification, a version specification, an OS specification, a time line, a risk, a cost, a performance result, an integration middleware specification, members associated with the opportunities, an upgrade, a product, a staging, other metadata, or combinations thereof.

As illustrated in FIG. 2, the system (200) includes a notifying system (204). The notifying system (204) includes a number of engines (216). The engines (216) refer to a combination of hardware and program instructions to perform a designated function. Each of the engines (216) may include a processor and memory. The program instructions are stored in the memory and cause the processor to execute the designated function of the engine. As illustrated, the notifying system (204) includes a receiving engine (216-1), an identifying engine (216-2), a list determining engine (216-3), a second user determining engine (216-4), and a sending engine (216-4).

In one example, opportunity A (206-1) is a sales opportunity in Siebel that captured a closed deal for a customer that includes product version eight, enhancement version seven. Associated with opportunity A (206-1) is metadata (208). In this example, the metadata (208) includes version information, fixpack information, platform information, issues discerned and solved and solutions to these, and areas of potential risk, among others. A first user may modify opportunity A (206-1). This causes a modification in the metadata (208) associated with opportunity A (206-1).

As mentioned above, the notifying system (204) includes a receiving engine (216-1). The receiving engine (216-1) receives at least one modification to an opportunity (206) stored in a CRM system (202). In this example, the receiving engine (216-1) receives the modification associated with opportunity A (206-1) stored in a CRM system (202).

As mentioned above, the notifying system (204) includes the identifying engine (216-2). In one example, the identifying engine (216-2) identifies a first user associated with the modification made to the opportunity (206) stored in the CRM system (202). For example, the identifying engine (216-2) identifies that the first user made a modification to opportunity A (206-1) that is stored in the CRM system (202). As a result, when a modification is received by the notification system (204), the identifying engine (216-2) identifies a user who modified the opportunity (206).

As mentioned above, the notifying system (204) includes a list determining engine (216-3). In one example, the list determining engine (216-3) determines a list of users associated with the opportunity. In one example, the list determining engine (216-3) determines users (230) associated with metadata (208) for opportunity A (206-1). The users (230) associated with metadata (208) may have been assigned responsibility for part of opportunity A (206-1). Further, the users (230) associated with metadata (208) may have a skill associated with an area of the metadata (208).

As mentioned above, the notifying system (204) includes a second user determining engine (216-4). The second user determining engine (216-4) determines, from a list of users associated with the opportunity (206), a second user associated with the first user through an IM service (225). As illustrated, the IM service (225) may include a number of users (230). For example, the users (230) may include a second user (230-2) and a third user (230-3). In one example, the list determining engine (216-4) may determine that the second user (230-2) is associated with opportunity A (206-1) and is associated with the first user through the IM service (225). In one example, the association between the first user and the second user (230-2) may allow the users to exchange instant messages. The association may also provide information about the users to each other. The information provided may include activity within the IM system (225), an amount of time since the last activity, or an indication that a message has been viewed.

As illustrated, the notifying system (204) includes the sending engine (216-4). The sending engine (216-4) sends an alert to the second user (230-2) of the IM (225) service. In one example, the alert indicates to the second user the modification made to the opportunity by the first user. In one example, the alert may be sent to a second user device (233). In this example, the alert indicates to the second user (230-2) the modification made to opportunity A (206-1) by the first user.

Further, the alert may be sent through the IM system (225) to a user device (222) used by the second user (230-2). In one example, the alert may change the status information displayed by the IM system (225). The IM system (225) may display the activity of a user by changing the color of an icon. A white icon may indicate that the user is not currently active on the system, while a green icon may indicate that the user is currently active. The sending engine (216-4) may send an alert that causes the icon to display a different color, such as blue, indicating that the user has modified opportunity A (206-1).

The alert sent to the second user may include a link, icon, or other mechanism to invoke the modification to opportunity A (206-1). The modification to opportunity A (206-1) allows the second user to perform an operation on opportunity A (206-1) if necessary. The operation may approve an action initiated by a first user. The operation may schedule an event to facilitate the second user making a contact related to opportunity A (206-1). The operation may inform the first user of additional information related to opportunity A (206-1). Any number of operations related to the first user, the second user, and the opportunity may be allowed to be invoked through the alert message.

While this example has been described with reference to the first user modifying opportunity A, the first user may modify other opportunities stored in the CRM system. For example, the first user modifying opportunity B and/or opportunity C.

Figure 3:
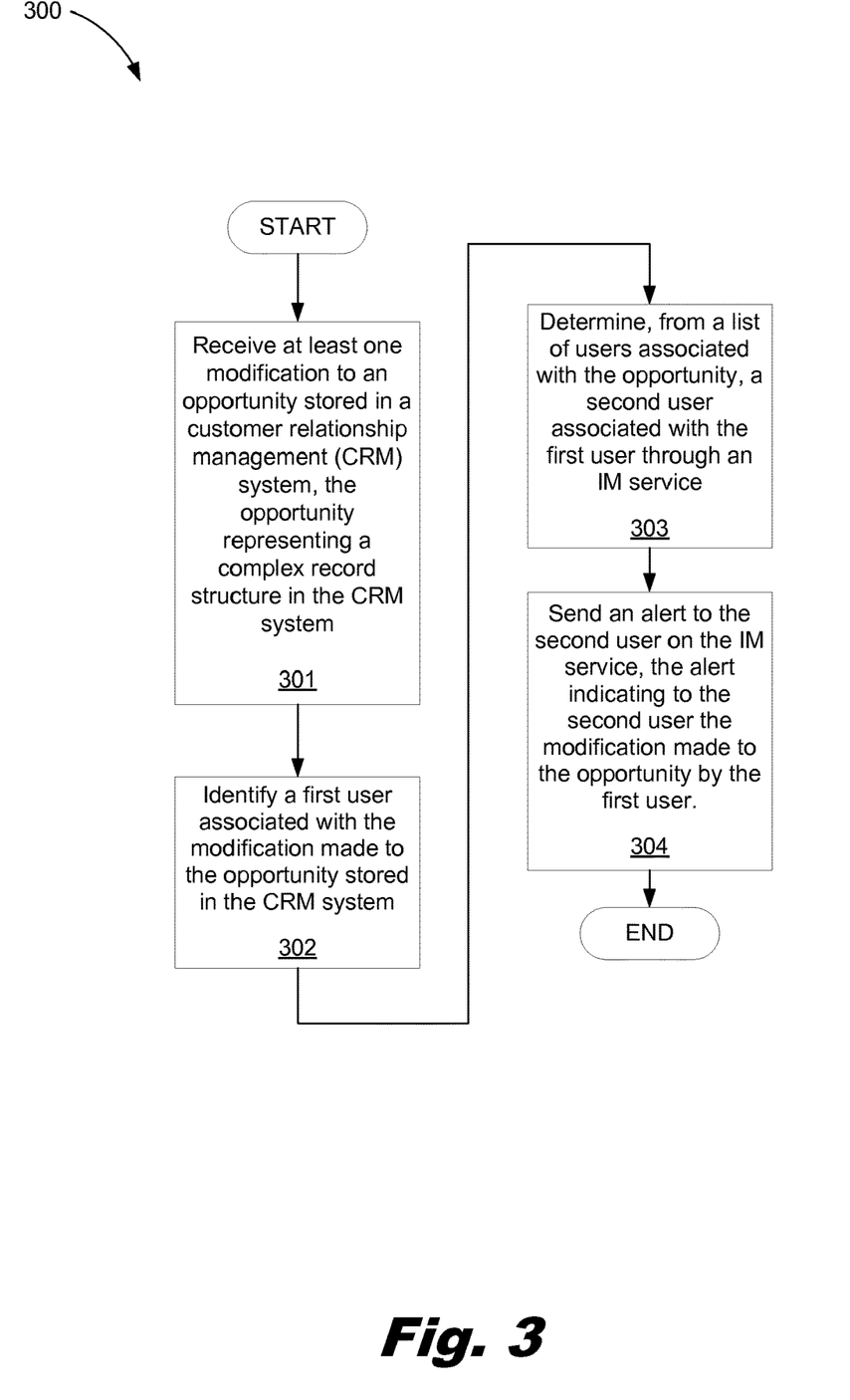
FIG. 3 is a flowchart of an example of a method for notifying a user of an IM service about a modification made to an opportunity, according to one example of principles described herein.

FIG. 3 is a flowchart of an example of a method for notifying members of an instant message service about a modification made to an opportunity, according to one example of principles described herein. In one example, the method (300) may be executed by a notifying system (100) of FIG. 1. In other examples, the method (300) may be executed by another system (i.e. system 200, system 500, and system 600). In this example, the method (300) includes receiving (301) at least one modification to an opportunity stored in a CRM system, the opportunity representing a complex record structure in the CRM system, identifying (302) a first user associated with the modification made to the opportunity stored in the CRM system, determining (303), from a list of users associated with the opportunity, a second user associated with the first user through an IM service, and sending (304) an alert to the second user on the IM service, the alert indicating to the second user the modification made to the opportunity by the first user.

As mentioned above, the method (300) includes receiving (301) at least one modification to an opportunity stored in a CRM system, the opportunity representing a complex record structure in the CRM system. As mentioned above, the CRM system uses techniques and methods to organize, automate and synchronize sales, for marketing, customer service, and technical support. The information used to support the techniques and methods may be stored in metadata. In one example, a receiving engine receives at least one modification to an opportunity stored in a CRM system. In one example, a user may make modifications to the metadata associated with an opportunity.

The method (300) may include identifying (302) a first user associated with the modification made to the opportunity stored in the CRM system. In one example, the identifying engine of FIG. 2 identifies a first user associated with the modification made to the opportunity stored in the CRM system. The identifying engine may include examining the modification received to determine a number of users that may be responsible for the modification.

In one example, a first user may be responsible for the modification if the first user initiated the activity that caused the modification. Further, a first user may be responsible for the modification if the modification received indicates that the first user is responsible for the modification. A first user may be determined as a result of an indication in the modification received.

In one example, a first user may record a transaction associated with an opportunity. The recording of the transaction may generate a notice that the transaction has been recorded, and the first user associated with the transaction. The first user may then be identified as initiating the transaction.

In another example, a first user may make a contact related to an opportunity. The CRM system may facilitate the contact. The CRM system may record that a contact has been made and that the first user is responsible for the contact.

As mentioned above, the method (300) includes determining (303), from a list of users associated with the opportunity, a second user associated with the first user through an IM service. Determining (303), from a list of users associated with the opportunity, a second user associated with the first user through an IM service may include examining metadata associated with an opportunity to construct the list of users associated with the opportunity. In one example, the list of users may be determined from a number of users that have worked on the opportunity, users with skills related to the metadata, users with interests associated with the metadata, users assigned to work on the opportunity, or similar relationships between users and the opportunity or metadata.

In another example, determining, from a list of users associated with the opportunity, a second user associated with the first user through an IM service may include comparing members of the list with relationships in an IM system. A member of the list that has a relationship with the first user associated with the opportunity may be identified as a second user. As mentioned above, the method (300) includes sending (304) an alert to the second user on the IM service, the alert indicating to the second user the modification the first user has made to the opportunity. In one example, the alert may indicate, via an icon, a symbol indicating the modification the first user has made to the opportunity. In one example, the alert may cause the IM service to indicate, via the icon, the number of modifications the first user has made to the opportunity.

The alert may provide to the second user a summary of the modification made by the first user. The summary may include information as to the area of the modification, the nature of the modification, a portion or all of the data associated with the modification, or a description of the modification, other summaries, or combinations thereof.

Further, the alert may provide a link to the second user. In one example, the link allows the second user to access the opportunity. The link may provide access to data related to the opportunity, data related to the modification made by the first user, or may provide access to perform additional modifications or operations on the opportunity.

In one example, the alert may include a link to a script to operate on the CRM system. The script may perform operations to approve a transaction or to make modification to the CRM system. In one example, an approval of a script may complete a transaction that was initiated by the first user, but may need the permission of the second user to complete the transaction.

Further, the alert may allow the second user to view other modifications the first user made to other opportunities stored in the CRM database. The alert may include information related to prior modifications made by the first user, allowing the second user to observe additional activity by the first user. In one example, the first user may have completed a number of sales due to promotional pricing in a product line. The second user may receive notice of a modification to an opportunity. The second user receiving the alert may observe that the first user has closed a number of sales, all for the same product. Upon examining the product pricing, the second user may be alerted as to promotional pricing on the product. This information may assist in setting future pricing, in order to encourage activity within the opportunities.

The alert may be delivered using additional protocols, such as a short message service (SMS), an electronic message such as electronic mail (email), an IM service, other delivery methods, or combinations thereof. In one example, the protocol for delivering the alert may include any protocol transmitting information form a first user to a second user, where the protocol is capable of providing status information as to the activity of the first user.

Figure 4:
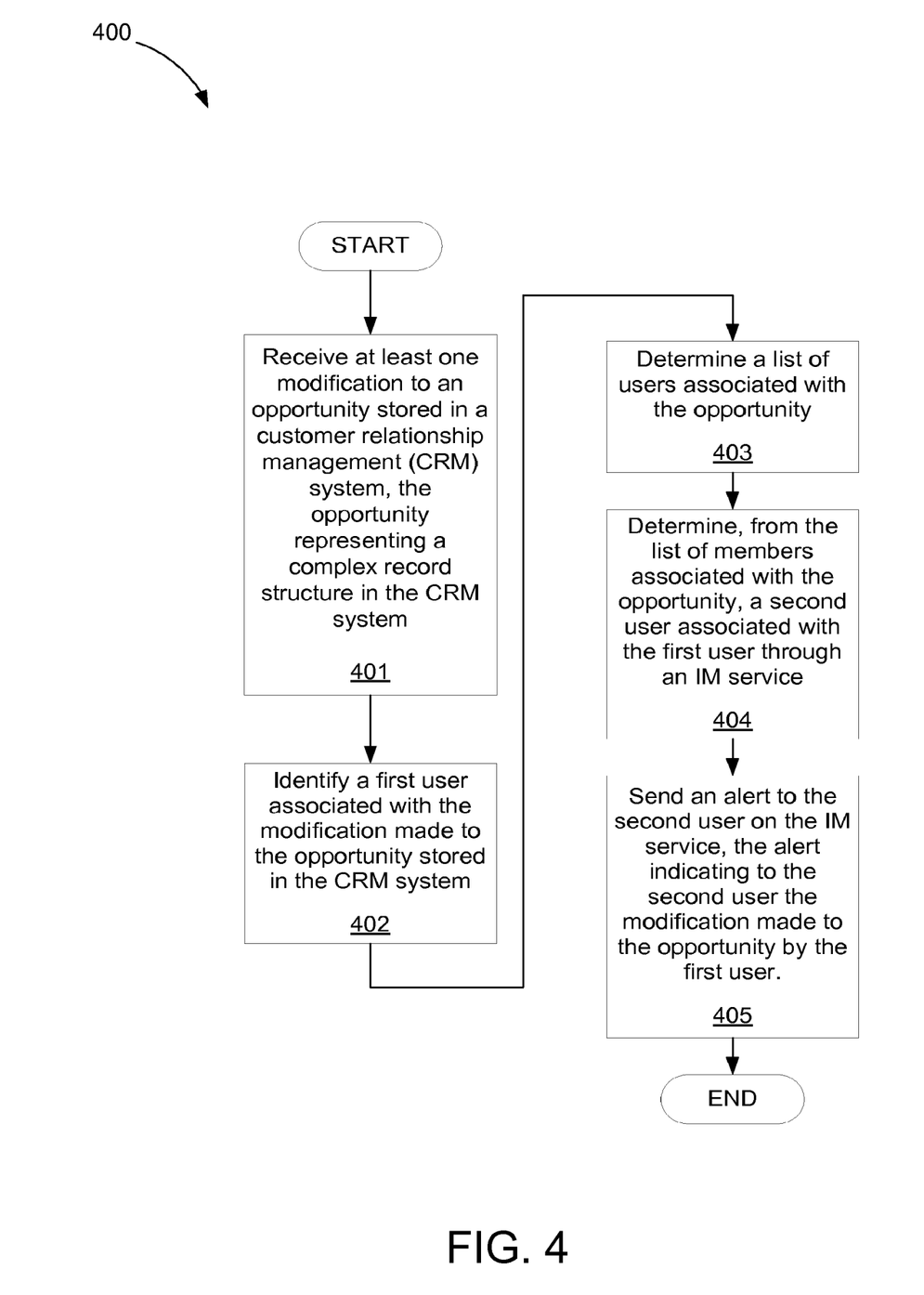
FIG. 4 is a flowchart of an example of a method for notifying a user of an IM service about a modification made to an opportunity, according to one example of principles described herein.

FIG. 4 is a flowchart of an example of a method for members of an instant messaging service about a modification to an opportunity, according to one example of principles described herein. In one example, the method (400) may be executed by the notifying system (100) of FIG. 1. In other examples, the method (400) may be executed by other systems (i.e. system 200, system 500, and system 600). In this example, the method (400) includes receiving (401) at least one modification to an opportunity stored in a CRM system, the opportunity representing a complex record structure in the CRM system, identifying (402) a first user associated with the modification made to the opportunity stored in the CRM system, determining (403) a list of users associated with the opportunity, determining (404), from a list of users associated with the opportunity, a second user associated with the first user through an IM service, and sending (405) an alert to the second user on the IM service, the alert indicating to the second user the modification made to the opportunity by the first user.

As mentioned above, the method (400) includes determining (403) a list of users associated with the opportunity. In one example, a list determining engine determines a list of users associated with the opportunity. For example, the list determining engine determines users associated with metadata for the opportunity A as described in FIG. 2. In this example, the users associated with metadata may have been assigned responsibility for part of the opportunity. Further, the users associated with metadata may have skills associated with an area of the metadata.

Figure 5:
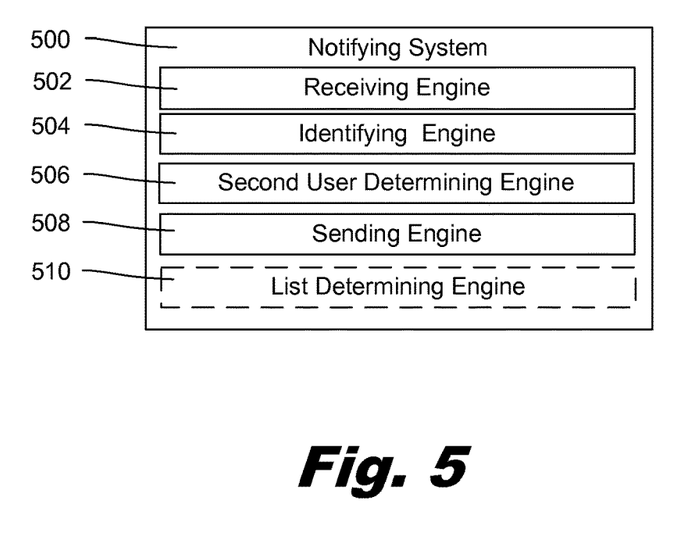
FIG. 5 is a diagram of an example of a notifying system, according to the principles described herein.

FIG. 5 is a diagram of an example of a notifying system (500), according to the principles described herein. The notifying system (500) includes a receiving engine (502), an identifying engine (504), a second user determining engine (506), and a sending engine (508). In this example, the notifying system (500) also includes a list determining engine (510). The engines (502, 504, 506, 508, 510) refer to a combination of hardware and program instructions to perform a designated function. Each of the engines (502, 504, 506, 508, 510) may include a processor and memory. The program instructions are stored in the memory and cause the processor to execute the designated function of the engine.

The receiving engine (502) receives at least one modification made to an opportunity stored in a CRM system, the opportunity representing a complex record structure in the CRM system, in which each of the opportunities captures a number of fields of metadata. In one example, the receiving engine (502) receives at least one modification made to several opportunities stored in a CRM system modifying, the modification modifying a sales engineer assigned to the opportunities. In another example, the receiving engine (502) receives at least one modification recording that a sale has occurred related to an opportunity. In another example, the receiving engine (502) receives at least one modification to an opportunity in a CRM system, the modification modifying a product that a customer may be interested in purchasing.

The identifying engine (504) identifies a first user associated with the modification made to the opportunity stored in the CRM system. In one example, the first user may the user who made the modification to the opportunity may be identified as the user responsible for the modification.

The second user determining engine (506) determines, from the list of users associated with the opportunity, a second user associated with the first user through an IM service. In one example, the second user may a user, a group of users, or combinations thereof.

The sending engine (508) sends an alert to the second user of the IM service, the alert indicating to the second user the modification made to the opportunity by the first user. In one example, the alert indicates, via an icon, the modification the first user made to the opportunity. The alert further includes a summary of the modification that the first user made to the opportunity. The alert further includes a link, the link allowing the second user to access the opportunity in the CRM system. Further, the alert allows the second user to view other modifications the first user made to other opportunities stored in the CRM system. Further, the sending engine (508) sends the alert to the second user on the IM service by sending the alert via the IM service, a SMS, an email, or combinations thereof.

The list determining engine (510) determines a list of users associated with the opportunity. In one example, the list determining engine (510) determines a list of users associated with several opportunities.

Figure 6:
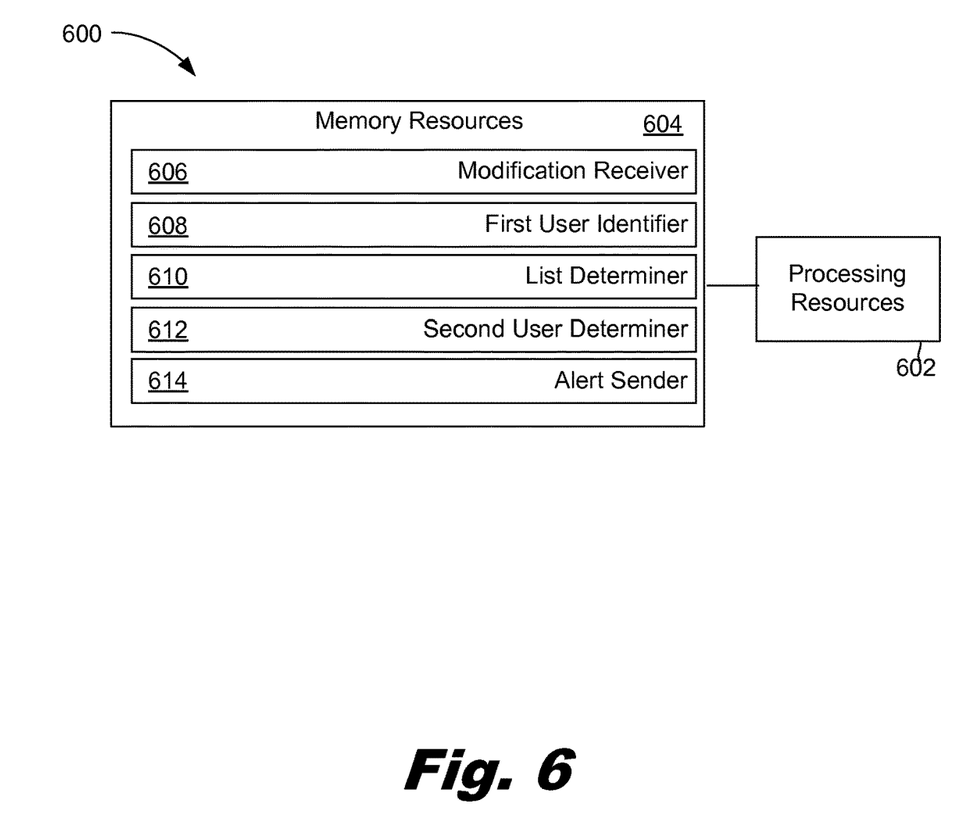
FIG. 6 is a diagram of an example of a notifying system, according to the principles described herein.

FIG. 6 is a diagram of an example of a notifying system (600), according to the principles described herein. In this example, the notifying system (600) includes processing resources (602) that are in communication with memory resources (604). Processing resources (602) include at least one processor and other resources used to process programmed instructions. The memory resources (604) generally represent any memory capable of storing data such as programmed instructions or data structures used by the notifying system (600). The programmed instructions shown stored in the memory resources (604) include a modification receiver (606), a first user identifier (608), a list determiner (610), a second user identifier (612), and an alert sender (614).

The memory resources (604) include a computer readable storage medium that contains computer readable program code to cause tasks to be executed by the processing resources (602). The computer readable storage medium may be tangible and/or physical storage medium. The computer readable storage medium may be any appropriate storage medium that is not a transmission storage medium. A non-exhaustive list of computer readable storage medium types includes non-volatile memory, volatile memory, random access memory, write only memory, flash memory, electrically erasable program read only memory, or types of memory, or combinations thereof.

The modification receiver (606) represents programmed instructions that, when executed, cause the processing resource (602) to receive at least one modification to an opportunity stored in a CRM system, the opportunity representing a complex record structure in the CRM system. The first user identifier (608) represents programmed instructions that, when executed, cause the processing resource (602) to identify a first user associated with the modification made to the opportunity stored in the CRM system.

The list determiner (610) represents programmed instructs that, when executed by a processor, cause the processing resource to determine a list of users associated with the opportunity. The second user determiner (612) represents programmed instructs that, when executed by a processor, cause the processing resource to determine, from the list of users associated with the opportunity, a second user associated with the first user through an IM service. The alert sender (614) represents programmed instructions that, when executed by a processor, cause the processing resource to send an alert to the second user on the IM service, the alert indicating to the second user the modification made to the opportunity by the first user.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, non-volatile memory, or elsewhere in the physical component's memory hierarchy. Alternatively, the memory resources (604) may be in communication with the processing resources (602) over a network. Further, the data structures, such as the libraries, may be accessed from a remote location over a network connection while the programmed instructions are located locally. Thus, the notifying system (600) may be implemented on a user device, on a server, on a collection of servers, or combinations thereof.

The notifying system (600) of FIG. 6 may be part of a general purpose computer. However, in alternative examples, the notifying system (600) is part of an application specific integrated circuit.

Figure 7:
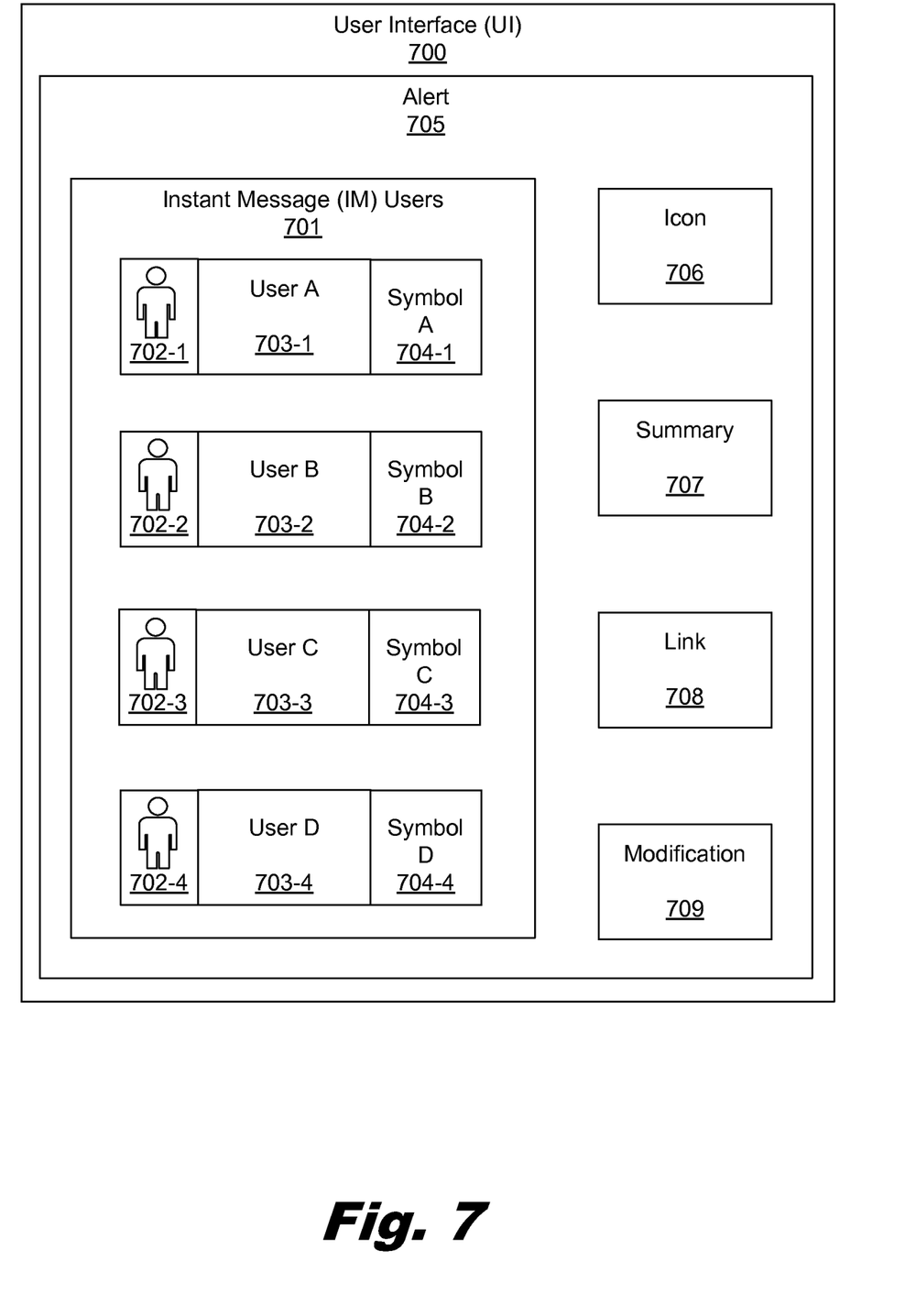
FIG. 7 is a diagram of an example of an alert displayed via a user interface (UI), according to the principles described herein.

FIG. 7 is a diagram of an example of an alert displayed via a user interface (UI), according to the principles described herein. As mentioned above, a sending engine of FIG. 2 sends an alert to the second user on the IM service, the alert indicating to the second user the modification made to the opportunity by the first user. As will be described below, the UI may be part of an IM system.

As illustrated, the UI (700) includes a number of IM users (701). In one example, the IM users (701) may be presented to a second user receiving a message indicating a change to a number of opportunities. An IM user (701) may have an image (702) associated with each IM user (701). Further, an IM user (701) may have a name (703) associated with each IM user (701). An IM user (701) may have a presence indicator (704) icon associated with the each IM user (701).

In one example, an IM user (701) may specify an image A (702-1) and a name (703-1). Image A (702-1) may be a picture of the IM user (701), or may be an image selected by the user (701) of another subject. Image A (702-1) may provide a visual reminder of the identity of the IM user (701).

An IM user (701) may also specify a name (703). In this example, a user has specified a name of user A (703-1). A different user has specified a name of user B (703-2). Another user has specified a name of user C (703-3). A final user has specified a name of user D (703-4)

In one example, the presence indicators (704) may indicate when an IM user (701) is active on an IM system. Further, the presence indicators (704) may indicate how much time has passed since the IM user (701) was last active on the IM system. The presence indicators (704) may indicate the nature of a device, such as a mobile device or a web access device, the IM user (701) uses to connect to the IM system. In one example, the presence indicators (704) may be a color, such as green, when the IM user (701) is active on the IM system. In another example, the presence indicators (704) may be grey when the IM user (701) is not active on the IM system. Further, the presence indicator (704) may be a symbol, such as symbol A (704-1), indicating when a user (701) has made a modification to an opportunity. Symbol A (704-1), may also indicate when an IM user (701), is active in the IM system, but has not recently changed any opportunities. Further, symbol A (704-1) may be a shape to indicate a user's activity. For example, symbol A (704-1) may use a circle to indicate presence of a user that is present but idle, a star to indicate the presence of a user that is present and active, or a crescent to indicate a user that is not presence. In one example, the presence indicators (704) may display different symbols for different users. For example, user A (703-1) may display symbol A (704-1), user B (703-1) may display symbol B (704-2), user C (703-3) may display symbol C (704-3), and user D (703-4) may display symbol D (704-4).

In one example, an alert engine may send an alert to alter the display of the presence indicator (704). The presence indicator (704) may show that a user recently modification to an opportunity. The presence indicator (704) may display an icon indicating a modification, or may change colors indicating a modification. For example, green is used to indicate activity, and grey is used to indicate inactivity, a third color, such as yellow, may indicate that the IM user (701) has modified an opportunity.

In another example, the alert engine may send an alert to alter the presence indicator (704). In one example the presence indicator may be green, indicating that the user (701) is active. The alert engine may send an alert to the IM user (701) that causes the presence indicator (704) to have a yellow background, indicating that the user has updated an opportunity. In this example, a IM user (701) would display both that they are active on the IM system, and also as that the IM user (701) recently modified an opportunity.

In another example, the alert engine may send an alert to display a symbol as a presence indicator (704) indicating the user (701) has made a change. For example, the user A (703-1) may display symbol A (704-1) indicating that User A (703-1) has made a modification to an opportunity. The user of the user interface (700) may be provided with a number of opportunities, such as using a mouse to click on the name user A (703-1) to display additional details on the change. The users User B (703-2) and User C (703-3) may display Symbol B (704-2) or Symbol C (704-3) indicating that the users are active on the IM system. The user (701) may display Symbol D (703-4) indicating that the user is not currently active on the IM system.

When User A (703-1) displays Symbol A (704-1) indicating that that User A (703-1) has modified an opportunity, the symbol may also serve to generate a report relating to the modification. The alert for User A (703-1) may provide additional detail as to the modification. The alert may be displayed by a number of mechanisms, such as clicking on the name for User A (703-1) or a cursor our mouse movement over the name.

The alert (705) may display an icon (706) indicating the nature of the modification to the opportunity. The icon (706) may inform the user of the nature of the change, that action is requested, or that action may be recommended by the system. The alert (705) may display a summary (707) describing the nature of the change that has been made. The alert (705) may display a link (708) to invoke a change to the opportunity. The link (708) may invoke changes such as approval to a prior change, a change of assignment, or second change to the opportunity. The alert (705) may include a full description of a modification (709) to the opportunity. The full description of the modification (709) may provide the entire change to the opportunity.

The preceding description has been presented to illustrate and describe examples of the principles described. This description is not intended to be exhaustive or to limit these principles to any precise form disclosed. Many modifications and variations are possible in light of the above teaching.

The flowchart and block diagrams in the figures illustrate the architecture, functionality, and operations of possible implementations of systems, methods, and computer program products. In this regard, each block in the flowchart or block diagrams may represent a module, segment, or portion of code, which has a number of executable instructions for implementing the specific logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combination of blocks in the block diagrams and/or flowchart illustration, can be implemented by special purpose hardware-based systems that perform the specified functions or acts, or combinations of special purpose hardware and computer instructions.

The terminology used herein is for the purpose of describing particular examples, and is not intended to be limiting. As used herein, the singular forms "a," "an" and "the" are intended to include the plural forms as well, unless the context clearly indicates otherwise. It will be further understood that the terms "comprises" and/or "comprising," when used in the specification, specify the presence of stated features, integers, operations, elements, and/or components, but do not preclude the presence or addition of a number of other features, integers, operations, elements, components, and/or groups thereof.

What is claimed is:

1. A system for notifying a user of an instant message (IM) service about a modification to an opportunity, the system comprising:
   a receiving engine to receive at least one modification made to an opportunity stored in a customer relationship management (CRM) system, the opportunity representing a record structure in the CRM system, in which each of the opportunities captures a number of fields of metadata;
   an identifying engine to identify a first user associated with the modification made to the opportunity stored in the CRM system by extracting from the modification received at the receiving engine, an indication of the first user;
   a list determining engine to, from extracted metadata from the opportunity, determine a list of users associated with the opportunity;
   a second user determining engine to determine, from the list of users associated with the opportunity, a second user associated with the first user through an instant messaging (IM) service by:
      comparing the list of users associated with the opportunity with a list of relationships for the first user in the IM service; and
      identifying as the second user, a user that is both on the list of users associated with the opportunity, as generated by the identifying engine, and that is on the list of relationships for the first user, as generated by the list determining engine; and
   a sending engine to:
      send an alert to the second user of the IM service, the alert indicating to the second user the modification made to the opportunity by the first user;
      responsive to the modification to the opportunity by the first user, alter a display of a presence indicator of the first user to present:
         a first indication to indicate that the first user is active; and
         a second indication to indicate that the first user has modified an opportunity; and
      responsive to altering the presence indicator, generate a report relating to the modification.

2. The system of claim 1, in which the alert indicates, via an icon, the modification the first user made to the opportunity.

3. The system of claim 2, in which the alert further comprises a summary of the modification that the first user made to the opportunity.

4. The system of claim 3, in which the alert further comprises a link, the link allowing the second user to access the opportunity in the CRM system.

5. The system of claim 1, in which the alert allows the second user to view other modifications the first user made to other opportunities stored in the CRM system.

6. The system of claim 1, in which the sending engine sends the alert to the second user on the IM service by sending the alert via the IM service, a short message service (SMS), an electronic message (email), or combinations thereof.

7. The system of claim 1, in which the alert notifies the second user of other opportunities all related to a same product that have received action by the first user.

8. The system of claim 1, in which the CRM system is a social CRM system with an interface to monitor social media sources for information.

9. The system of claim 1, in which the alert from the sending engine causes an icon to change color to indicate that the first user has modified a specific opportunity.

10. The system of claim 1, in which the IM service comprises an icon, the color of which indicates the activity of the first user.

11. The system of claim 10, in which the alert from the sending engine causes the icon to change color to indicate that the first user has modified a specific opportunity.

12. The system of claim 1, in which the alert comprises a mechanism to allow the second user to approve an action initiated by the first user.

13. A computer program product for notifying a user of an instant message (IM) service about a modification made to an opportunity, comprising:
- a tangible computer readable storage medium, said tangible computer readable storage medium comprising computer readable program code embodied therewith, said computer readable program code comprising program instructions that, when executed, causes a processor to:
- identify a first user associated with a modification made to an opportunity stored in a customer relationship management (CRM) system by extracting from the modification, an indication of the first user;
- determine, from extracted metadata from the opportunity, a list of users assigned responsibility for the opportunity;
- determine, from the list of users assigned responsibility for the opportunity, a second user associated with the first user through an instant messaging (IM) service by:
  - comparing the list of users assigned responsibility for the opportunity with a list of relationships for the first user in the IM service; and
  - identifying as the second user, a user that is both on the list of users assigned responsibility for the opportunity and that is on the list of relationships for the first user;
- send an alert to the second user of the IM service, the alert indicating to the second user the modification made to the opportunity by the first user;
- responsive to the modification to the opportunity by the first user, alter a display of a presence indicator of the first user to present:
  - a first indication to indicate via a color of an icon that the first user is active; and
  - a second indication to indicate via a background color of the icon that the first user has modified an opportunity; and
- responsive to altering the presence indicator, generating a report relating to the modification.

14. The product of claim 13, further comprising computer readable program code comprising program instructions that, when executed, cause said processor to receive the modification made to the opportunity stored in the CRM system, the opportunity representing a record structure in the CRM system, in which each of the opportunities captures a number of fields of metadata.

15. The product of claim 13, in which the alert indicates, via an icon, the modification the first user made to the opportunity.

16. The product of claim 15, in which the alert further comprises a summary of the modification that the first user made to the opportunity.

17. The product of claim 16, in which the alert further comprises a link, the link allowing the second user to access the opportunity in the CRM system.

18. The product of claim 13, in which the alert allows the second user to view other modifications the first user made to other opportunities stored in the CRM system.

19. The product of claim 13, further comprising computer readable program code comprising program instructions that, when executed, cause said processor to send the alert via the IM service, a short message service (SMS), an electronic message (email), or combinations thereof.

20. The product of claim 13, in which the alert notifies the second user of other opportunities all related to a same product that have received action by the first user.

* * * * *